Oct. 31, 1939.  H. W. HAPMAN  2,178,342

UNIVERSAL CONVEYER

Original Filed April 23, 1937   2 Sheets-Sheet 1

Inventor —
Henry W. Hapman

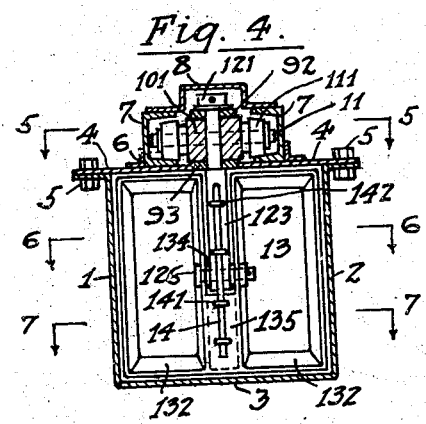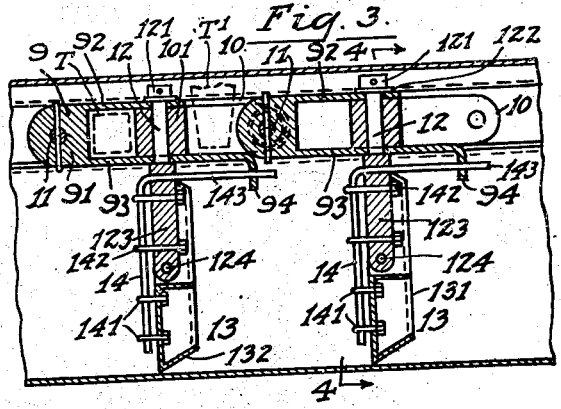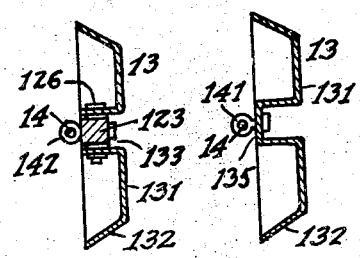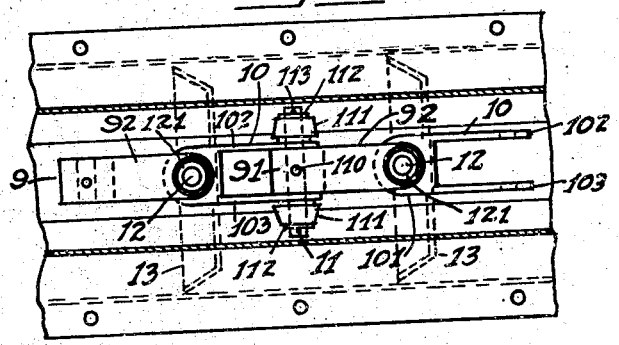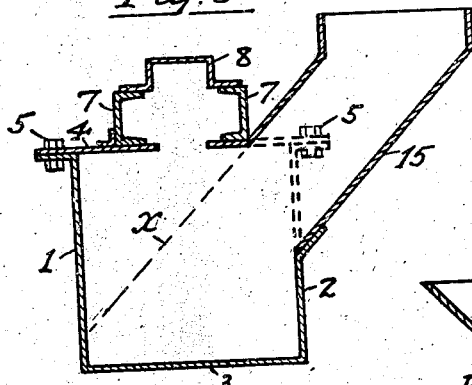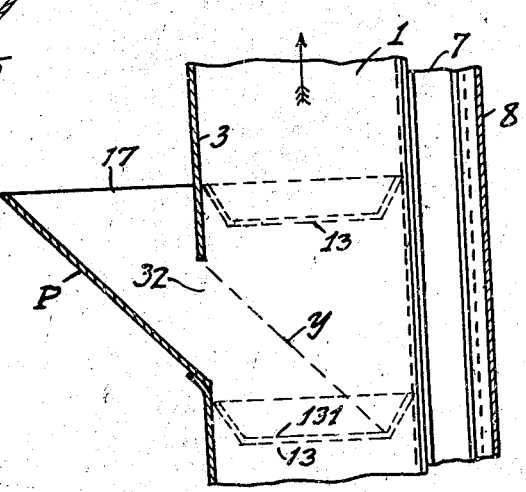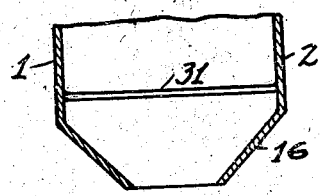

Patented Oct. 31, 1939

2,178,342

UNITED STATES PATENT OFFICE 2,178,342

UNIVERSAL CONVEYER

Henry W. Hapman, Detroit, Mich.

Substitute for abandoned application Serial No. 138,665, April 23, 1937. This application October 18, 1938, Serial No. 235,655

6 Claims. (Cl. 198—168)

This application is filed as a substitute for my abandoned application Serial No. 138,665, filed on April 23, 1937.

My invention relates to conveyers of the "flight" type, in which loose, granular, or pulverulent material is propelled along the interior of a fixed casing by means of a series of moving elements arranged in co-operative relation with a travelling chain, and its principal object is to provide a conveyer of the character referred to by which material may be carried with equal efficiency in a horizontal, vertical, or inclined direction as well as around curves arranged in vertical or horizontal planes.

Another object of my invention is to provide a conveyer into which material may be fed either along vertical or horizontal runs and from which the said material may be discharged at any point along a horizontal run.

Another object is to provide a conveyer having a loading means by which the rate of feed is automatically measured, so as to ensure uniformity of loading and avoid choking.

Another object is to provide a conveyer of the type referred to in which the propelling chain is located outside of the main casing, whereby excessive friction and abrasion of the parts is avoided and the necessary driving power very greatly reduced.

Another object is to provide a conveyer in which the propelling members are cut away or hollowed on their working face so that they will automatically and completely clear out the casing after the feeding of material is stopped.

A further object of my said invention is to provide a conveyer in which the propelling members are yieldingly supported from the driving chain in such manner that they will be deflected on coming in contact with inordinately large pieces of material or with foreign objects such as tramp iron, thereby avoiding breakage of the parts under such conditions. This method of supporting the propelling members also provides for inequalities of pressure resulting from their radial disposition when passing around curves.

With these and other objects in view, I will now describe a preferred embodiment of my invention with reference to the accompanying drawings in which—

Figure 3 is a fragmentary longitudinal section, taken upon the center line, showing a short section of my improved conveyer.

Figure 4 is a transverse section taken on line 4—4 of Figure 3.

Figure 5 is a fragmentary horizontal section taken on line 5—5 of Figure 4.

Figure 6 is a sectional plan view of one of the propelling members or flights taken on line 6—6 of Figure 4.

Figure 7 is a similar section taken on line 7—7 of Figure 4.

Figure 8 is a transverse section of the conveyer casing showing one method of applying a feeding hopper on horizontal runs.

Figure 9 is a fragmentary transverse section showing one form of discharge opening as used on horizontal runs, and Figure 10 is a fragmentary vertical section of the casing showing one form of feeding hopper as applied to vertical runs.

Like characters designate corresponding parts throughout the several views.

Figure 1:
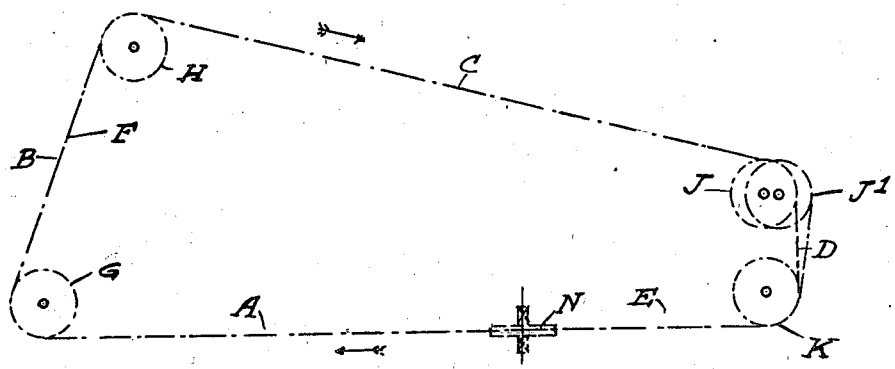
Figure 1 is a diagrammatical plan view.
Figure 2:
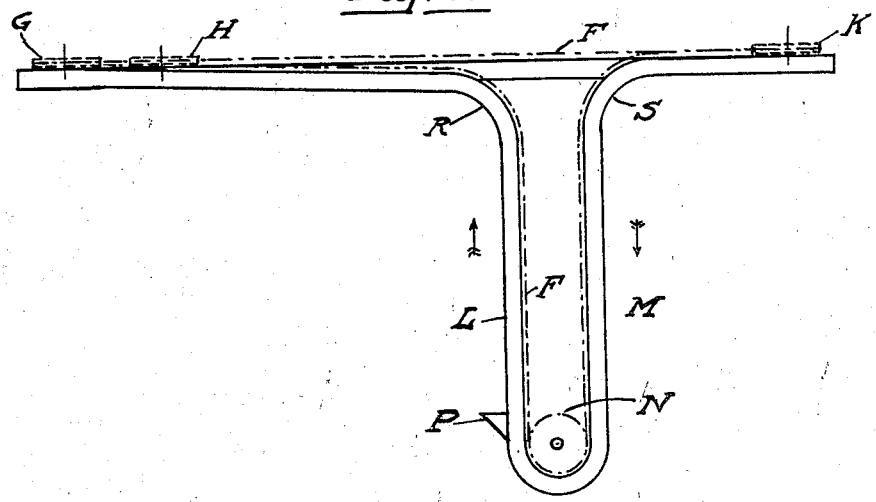
Figure 2 is a diagrammatical elevational view.

Referring now more particularly to Figures 1 and 2 of the drawings, A, B, C, D, and E indicate sections of a horizontal run in which the propelling chain F passes around sprockets G, H, J, and K; and L, M designate upward and downward vertical runs of the same conveyer, N indicating a sprocket which rotates in a vertical plane and P a feeding hopper. The vertical runs L and M are connected to the horizontal sections A and E, respectively, by curved portions R and S in which sprockets are dispensed with. In the arrangement shown, K is the driving sprocket and J is the take-up sprocket whose alternative position is indicated at J' in the plan view Figure 1. The driving and take-up mechanisms being of conventional construction and forming no part of the present invention, further description of them is deemed unnecessary. It may be pointed out, however, that the position of the drive and the take-up may be located otherwise than as herein shown, according to the particular requirements of the lay-out.

Referring now more particularly to Figures 3 to 7, inclusive, of the drawings, the conveyer casing consists in general of a pair of side members 1, 2 formed in one piece with a bottom member 3 and closed at the top by covers 4 which are connected by bolts 5 to flanges formed integral with the vertical members 1, 2. Superposed upon the cover members 4 and secured thereto by angles 6 are a pair of channel members 7 which are adapted to form trackways for the propelling chain as will be hereinafter explained. The upper flanges of the channels 7 are connected together by a cover 8 which is secured to them by bolts, welding or other means so that the whole forms a completely enclosed casing in which the driving chain and the propelling members are contained.

The driving chain itself comprises a series of alternate links 9, 10 which are connected together by horizontal pins 11 and vertical pins 12 in such manner that the chain is capable of being bent both in a horizontal and vertical plane. The links 9 consist of a boss 91 having a pair of side members 92, 93, both the members having openings adapted to rotatably receive the pins 12, while the links 10 consist of a boss 101 having a pair of side members 102 and 103, both of these members having openings adapted to rotatably receive the pins 11.

The links 9 and 10 are duplicates one of the other with the exception that the links 9 are provided with a downwardly extending tail-piece 94 on their lower sides, as shown clearly in Figure 3. The pins 11 are secured in position within the links 9 by tapered pins 110, and upon their outer ends are mounted the conical rollers 111 which are secured in position endwise by washers 112 and cotter pins 113. These rollers, as will be seen by reference to Figure 4 of the drawings, travel within the channel track-ways 7 by which the chain is guided in any desired direction. It will also be observed in Figure 4 that the lower portions 93 of the links 9 project downwardly between the adjacent edges of the cover members 4 so that they form a closure for the main casing and prevent leakage of the material into the upper part of the casing which carries the chain.

The pins 12 are provided upon their upper ends with collars 121 and washers 122, and upon their lower ends are extensions 123 of rectangular cross section terminating in eyes 124 which carry transverse bolts 126.

Upon the bolts 126 are pivoted the flights or propelling members 13. Each of these members consists essentially of a pair of flat back portions 131 having circumferential flanges 132 preferably disposed at an angle of about sixty degrees from the plane of the back portion, though this angle may sometimes be varied according to the particular requirements of each individual case. Intermediate the back members 131 is a vertical slot 133, shown clearly in Figure 6 of the drawings, which normally extends for some distance beyond the center of the flights and provides a working space for the rectangular extensions 123 of the pins 12, there being clearance spaces between the slot and the extension in which are provided washers 134 mounted upon the bolts 126. The slot 133, beyond the end of the extension 123, is closed by a front member 135, as shown in Figures 4 and 7.

It will be understood from the above description and by reference to the drawings that the flights are susbtantially balanced upon the bolts 126 and, in order to limit their movement about the same, there is provided on each flight a resilient member 14, preferably of round spring steel, which is arranged parallel to the face of the flight and secured to the flight at its lower end by eye bolts 141, and secured to the extensions 123 at its upper end by eye bolts 142. Upon the upper end of the member 14 and at right engles thereto is an extension 143, which passes through an opening in the tail-piece 94 of the adjacent link 9. In this manner the flight is held resiliently so as to permit its movement about the supporting bolt 126, such movement being limited by the strength of the spring member 14 so that each flight can be deflected to a limited extent so as to prevent breakage of the parts should any undue resistance be exerted against movement of the flights. The spring member 14 also yieldingly resists oscillatory movement of the flight about its supporting pin 12, thereby providing for inequalities of pressure resulting from radial disposition of the several flights when passing around curves.

In Figure 8 of the drawings is shown a transverse section of the conveyer casing having a feeding hopper 15 attached thereto. This hopper, it will be observed, is placed to one side of the main casing in such manner that material fed into the hopper will fill the casing only as far as the dotted line $x$, which represents the angle of repose of the material. By this arrangement, overloading of the conveyer is prevented when feeding upon a horizontal run.

Figure 9 is a fragmentary transverse section showing the lower portion of the main casing having an opening 31 in the bottom 3, below which is a discharge hopper 16. In Figure 10 is shown a fragmentary section taken through the center line of a vertical run of the conveyer casing. In this view the feed hopper 17 is attached to the bottom member 3 of the casing, there being an opening 32 through which material can flow to an extent limited by the angle of repose of the material as indicated at $y$.

Since the alternate openings in the links are at right angles to one another, it will be necessary to make the co-acting sprockets with half the usual number of teeth. This arangement is shown clearly in Figure 3 in which the tooth of a sprocket rotating in a horizontal plane is indicated in dotted lines at T engaging a link 9, while the tooth of a sprocket rotating in a vertical plane is similarly indicated at T1 engaging one of the links 10.

It will be observed from the foregoing description and by reference to the drawings that I have provided a conveyer which is adapted to operate in any desired direction and to which material may be fed at any point along vertical or horizontal runs. Further, I have provided a conveyer which is capable of operating continuously for long periods without attention, due to the fact that the guiding means for the propelling members is located outside of the casing, and in which the said members are resiliently held so that they are protected from excessive strains.

While I have herein described and shown a preferred embodiment of my invention, it will be understood by those skilled in the art to which the same relates that I may make various modifications in detail to suit any particular requirements without departing from the spirit of my invention as defined in the appended claims.

Having thus described my said invention, what I claim and desire to secure by Letters Patent of the United States is:

1. A conveyer comprising a trough-like conduit having a cover provided with longitudinal slot, a conveyer chain operating outside of said cover and having appropriate driving means, a series of pins rotatably carried upon said chain and projecting through said slot, and a series of flights pivoted to said pins at right angles to the axes thereof and adapted to sweep said conduit and to propel material therealong, there being resilient means between said chain and said flights for yieldingly holding the latter in normal position.

2. A conveyer for transporting material in bulk, comprising a closed conduit disposed in a desired circuit and provided with entry and discharge openings, a track-way positioned exteriorly of said conduit, a conveyer chain operating within said track-way comprising a series of links connected by pins arranged alternately at right angles one to the other, and a series of flights carried upon alternate pins and adapted to sweep the interior of said conduit and to propel material therealong.

3. A conveyer for transporting material in bulk, comprising a closed conduit disposed in a desired circuit and provided with entry and discharge openings, a track-way positioned exteriorly of said conduit, a conveyer chain operating within said track-way comprising a series of links connected by pins arranged alternately at right angles one to the other, and a series of flights resiliently mounted upon alternate pins and adapted to sweep the interior of said conduit and to propel material therealong.

4. A conveyer for transporting material in bulk, comprising a closed conduit disposed in a desired circuit and provided with entry and discharge openings, a track-way positioned exteriorly of said conduit, a conveyer chain operating within said track-way comprising a series of links connected by two series of pins arranged alternately at right angles one to the other, one of said series projecting into the said conduit, and a series of flights pivotally connected to said last-mentioned series of pins and adapted to sweep the interior of said conduit and to propel material therealong.

5. A conveyer for transporting material in bulk, comprising a closed conduit disposed in a desired circuit and provided with entry and discharge openings, a track-way positioned exteriorly of said conduit, a conveyor chain operating within said track-way comprising a series of links connected by two series of pins arranged alternately at right angles one to the other, one of said series projecting into the said conduit, and a series of flights pivotally and resiliently connected to said last-mentioned series of pins and adapted to sweep the interior of said conduit and to propel material therealong.

6. A conveyer for transporting material in bulk, comprising a closed conduit disposed in a desired circuit and provided with entry and discharge openings, a continuous slot in said conduit, a track-way positioned exteriorly of said conduit in alignment with said slot, a conveyor chain operating within said track-way and provided with appropriate driving mechanism, and a series of flights pivotally and yieldingly connected to said chain and adapted to sweep the interior of said conduit and to propel material therealong, said chain being adapted to form a closure for said slot and to prevent material from passing between said conduit and said track-way.

HENRY W. HAPMAN.